(12) United States Patent
Ballard (10) Patent No.: US 12,233,298 B2
(45) Date of Patent: Feb. 25, 2025

(54) MULTI-PURPOSE PUMP

(71) Applicant: Paul C. Ballard, Laguna Beach, CA (US)

(72) Inventor: Paul C. Ballard, Laguna Beach, CA (US)

(*) Notice: Subject to any disclaimer, the term of this patent is extended or adjusted under 35 U.S.C. 154(b) by 0 days.

(21) Appl. No.: 17/976,830

(22) Filed: Oct. 30, 2022

(65) Prior Publication Data

US 2024/0139565 A1 May 2, 2024

(51) Int. Cl.
| | |
|---|---|
| *F16K 15/02* | (2006.01) |
| *A62C 5/02* | (2006.01) |
| *A62C 31/12* | (2006.01) |
| *F04B 53/10* | (2006.01) |
| *F04D 7/04* | (2006.01) |

(52) U.S. Cl.
CPC ............. *A62C 5/022* (2013.01); *A62C 31/12* (2013.01); *F04B 53/1077* (2013.01); *F04D 7/045* (2013.01); *F16K 15/025* (2013.01)

(58) Field of Classification Search
CPC ..... A62C 5/022; A62C 31/12; F04B 53/1077; F04D 7/045; F16K 15/025
See application file for complete search history.

(56) References Cited

U.S. PATENT DOCUMENTS

| | | | | |
|---|---|---|---|---|
| 5,623,995 | A * | 4/1997 | Smagac | B01F 25/43161 169/30 |
| 2018/0272164 | A1* | 9/2018 | Knight | A62C 5/02 |
| 2020/0215372 | A1* | 7/2020 | LaVergne | A62D 1/0071 |

* cited by examiner

*Primary Examiner* — P. Macade Nichols
(74) *Attorney, Agent, or Firm* — Owen J. Bates (57) ABSTRACT

The present invention discloses an improved compressed air foam pumping/generation system in which the compressed gas that is used to drive a pumping system is re-utilized and introduced into the outlet manifold to more efficaciously generate a compressed gas foam. A further improvement could include a three-way valve which controls the flow of the compressed gas so that the present invention could be used to generate CAF, aspirated foam (with use of an appropriate nozzle), gels or operate as a simple pump. Additional optional components include a check valve and flexible connection material.

24 Claims, 6 Drawing Sheets

MULTI-PURPOSE PUMP

CROSS-REFERENCE TO RELATED APPLICATIONS

Not Applicable

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING

Not applicable

STATEMENT REGARDING PRIOR DISCLOSURES BY THE INVENTOR

None

BACKGROUND OF THE INVENTION

Introduction

The present invention is an improvement of an easily operated system for the generation of compressed air foam, typically used in suppression and defensive firefighting situations.

There have been several techniques which have been developed over the years which have been used to fight fires. Dirt and water have been used for thousands of years as a means to smother fires. More recently, water dispensing systems, including fixed, mobile and portable systems have been developed to facilitate the extinguishing and prevention of fires.

Water alone, though effective, has significant drawbacks, which include weight, availability, resulting damage to property, and failure to adhere to vertical and inverted surfaces. Any reasonable amount of water, which weighs about eight pounds per gallon, is extremely heavy and either has to be stored on site, made accessible via plumbing/pumping systems which must stay operational during a fire, or transported to the site. Each of these solutions has significant drawbacks.

To address these shortcomings, a more efficient use of water has been developed. Systems which use a foaming agent in conjunction with water to create a foam which can be sprayed directly on houses, barns, or any other flammable structure or material, whether burning or not. The foam that is created can cover and coat and therefore protects a great deal more surface than the water alone.

Foams designed to protect material from burning are called defensive foams and use one type of foaming agent. Foams designed to be used on burning material are called suppressant foams and use a separate type of foaming agent. Defensive foams tend to be thicker and stickier and will cling to vertical and overhanging surfaces better. Suppressant foams are light and more aerated and designed to cover and smother already burning material, such as a spilled liquid fire. In addition, suppressant foams are designed to dissipate quickly.

Foaming systems are divided into two general classes. These are aspirated foam systems and compressed air foam systems also known as CAFS. It should be noted that although the term CAFS, which is a standard term used in the industry, uses the word "air", many other compressed gases can be used, and the present invention is not limited to the use of compressed air. These systems will be referenced in this application as compressed gas foam systems or by the initialism, CAFS. CAF will be used to refer to compressed air foam/foams.

Aspirated foam systems do not use compressed gases to create the foam. A mixture of foam concentrates and water is pumped through a special aspirating nozzle located at the end of the delivery hose. The aspirating device has an additional inlet into which atmospheric air is drawn by the water flowing through the specially designed aspirated foam nozzle. This type of nozzle is designed to draw in atmospheric air and mix it with the foam concentrate-water mix to create the foam. (See the discussion of eductor proportioning systems later in this specification.) Aspirated foam systems are not powered by compressed gases. Aspirated foam systems can generate low, medium and high expansion foams. The medium and high expansion foams systems do not propel/project the foam a great distance from the end of the nozzle. Many aspirated foams are often used for laying firebreaks along the ground and down hillsides. Thus, aspirated foam systems are often referred to as low-energy systems.

Compressed gas foam systems operate by a different method. A compressed gas is introduced into the foam concentrate-water mixture under pressure, usually in the range of 60-100 psi. The gas is mixed with the foam concentrate-water mixture. This can be accomplished by several techniques, including but not limited to use of an active mixing device or a passive mixing device which can be as simple as a long length of fire hose. Once the foam, which is now under high pressure, exits the delivery hose, it can travel for quite a distance, usually as much as 70 to 100 feet. Thus, CAFS are referred to as high-energy systems. This feature enables the user to direct the foam to hard-to-reach distant locations such as the second stories of buildings and under eaves on roof overhangs and tree canopies. A further advantage is that this allows the user to be positioned at a safer distance from the fire.

As discussed above, both the aspirated and CAFS create the foam from a foam concentrate-water mixture. There are several ways in which the mixture can be made. One method is to simply mix the two components together in one tank and then introduce that mixture into the inlet of the pump of the CAFS. This is an acceptable method in some situations, but some foam concentrates have a limited useful life after the foam concentrate has been mixed with water.

Another method is to use an eductor proportioning system which can be located on the inlet side or outlet side of the pump. In either case, the water that is either being drawn into the pump or delivered out of the pump is directed through a venturi-type device which creates a vacuum on an auxiliary inlet port or direct injection under pressure. This auxiliary inlet port is connected to a tank of the foam concentrate. The actual ratio of the two components depends on such factors as the size of the various inlet and outlet openings, flow rate of the water, and the size of the interior channels of the eductor.

The compressed gas is generally provided by one of two means. The first is a standard high-pressure cylinder or compressed gas tank. The second is a mechanically or electrically driven air compressor. The compressor can be driven by an electric motor or an internal combustion engine. The use of an internal combustion engine can be problematic for several reasons. In fire situations, the electrical supply may not be operating. Likewise, internal combustion engines may not run because the local environment can become oxygen depleted because of the fire. In the case of gasoline engines, the fuel stored in the tanks can deteriorate. Gasoline is not a pure component, but rather a mixture of components of varying volatilities, in order to provide safe and efficient fuel for internal combustion engines. As gasoline ages, the lower molecular weight components evaporate. Because these tend to be the more volatile components, older gasoline doesn't vaporize as well and an engine using older gasoline will be harder to start and harder to keep running. Thus, gasoline driven compressors require considerable maintenance and upkeep in order to be a reliable source of compressed gas.

This drawback regarding the use of gasoline engines can be avoided by the use the pressured tanks of propane or natural gas as the fuel.

In addition, a compressor could be driven by a power-take-off (PTO) driving element that is often found on farm or commercial equipment. Some larger trucks and vans can be configured with an air compressor mounted within the engine compartment and belt-driven by the crankshaft.

Another solution is to provide a bank of compressed gas cylinders which will supply the compressed gas for the generation of the foam. In addition, the pump can also be designed to be driven by the same compressed gas, so that it too is independent of the local electrical supply and/or internal combustion engines.

Although the above sources might be the most common, any source of compressed gas at the proper pressure and flow rate could be used to drive the pump of the present invention.

Prior Art

Variations of the standard CAFS have included reusing the compressed gas after it has exited from a gas driven pump. The exhaust gas is used to generate the compressed gas foam without having to supply a separate compressed gas source to generate the foam. The exhaust gas is introduced into the liquid output of the pump which aerates the liquid. One method of reusing the exhaust gas is shown in U.S. Pat. No. 6,109,359.

U.S. Pat. No. 6,109,359 ('359)

As shown in FIG. 3, of the '359 patent, compressed gas from the exhaust Port 195 is placed in fluid communications with an inlet port of Mixing Tee 210. The Fluid output of Pump 190 is placed in fluid communications with the second inlet port of Mixing Tee 210. This results in the generation of compressed gas foam 310 which is driven out of Mixing Tee 210 and into Hose 330. It should be noted that the mixing Tee 210 is located outside of the pump and introduces the compress gas into the pumped liquid after the liquid has exited from the pump. The use of mixing tee on the output of Pump 190 requires hardware, installation time, and is a potential source of leaks. In addition, there is no co-axial alignment of the exhaust gas with the outlet manifold.

U.S. Pat. No. 6,276,459 ('459)

Another variation of this design is disclosed in U.S. Pat. No. 6,276,459. As shown in FIGS. 1-4, a mixer 38, also referred to as an injector is placed inline with the output fluid of the Pump 18. The mixer includes a tubular body 40, a t-connector 44, and clip 54 to allow the introduction of the exhaust gas into the output fluid stream (Col. 3 In 55-Col. 4 In 24). As discussed above with regard to the '359 patent, the '459 patent requires a multi-component mixer and a gas-driven Piston Proportioner 32 (FIG. 1). Like disclosed in patent '459, the gas-driven piston proportioner generates the foam by mixing the compressed gas and pumped liquid outside of the pump.

General Operation of an Existing Dual Diaphragm Pump

Though there are several types of compressed gas driven pumps that can be incorporated into the instant invention, an existing dual-diaphragm pump design is discussed herein because it is included in one embodiment of the instant invention.

The pump has two pumping chambers, each pumping chamber having an inlet port, an outlet port, an inlet check valve, and outlet check valve and a flexible diaphragm driven by a pneumatic piston that is driven back and forth between two positions. As the piston is driven in one direction, the attached diaphragm is pulled away from the pumping chamber causing the volume of the pumping chamber to expand and thus creating a vacuum. A fluid, powder or other substance is then drawn in through the inlet check valve and into the first pumping chamber. The outlet valve is oriented so that as the volume of the first pumping chamber increases, the outlet check valve is seated, preventing and fluid, powder or other substance that might be positioned past the outlet check valve from being drawn into the first pumping chamber. After the pneumatic piston has expanded the first pumping chamber to its maximum volume and then reverses direction, traveling in the opposite direction. As it so moves, the fluid in the first pumping chamber is pressured, the inlet check valve is seated and prevents any fluid from being pumped back out the inlet. The outlet check valve now opens and the fluid in the first pumping chamber is driven through the outlet check valve which being forced into the open position allows the fluid to move out of the first pumping chamber, into the outlet chamber and exits the pump via the outlet port.

Each of the two flexible diaphragms is attached to opposite ends of the pneumatic piston. As the pneumatic piston is being driven back and forth between the two positions, each flexible diaphragm is driven back and forth as described above. However, the filling and pumping cycle of the two pumping chambers is out of phase by 180 degrees. When one pumping chamber is fully expanded to maximum volume, the other pumping chamber is fully reduced to its minimum volume.

Detailed Description of an Existing Dual Diaphragm Pump

Figure 1:
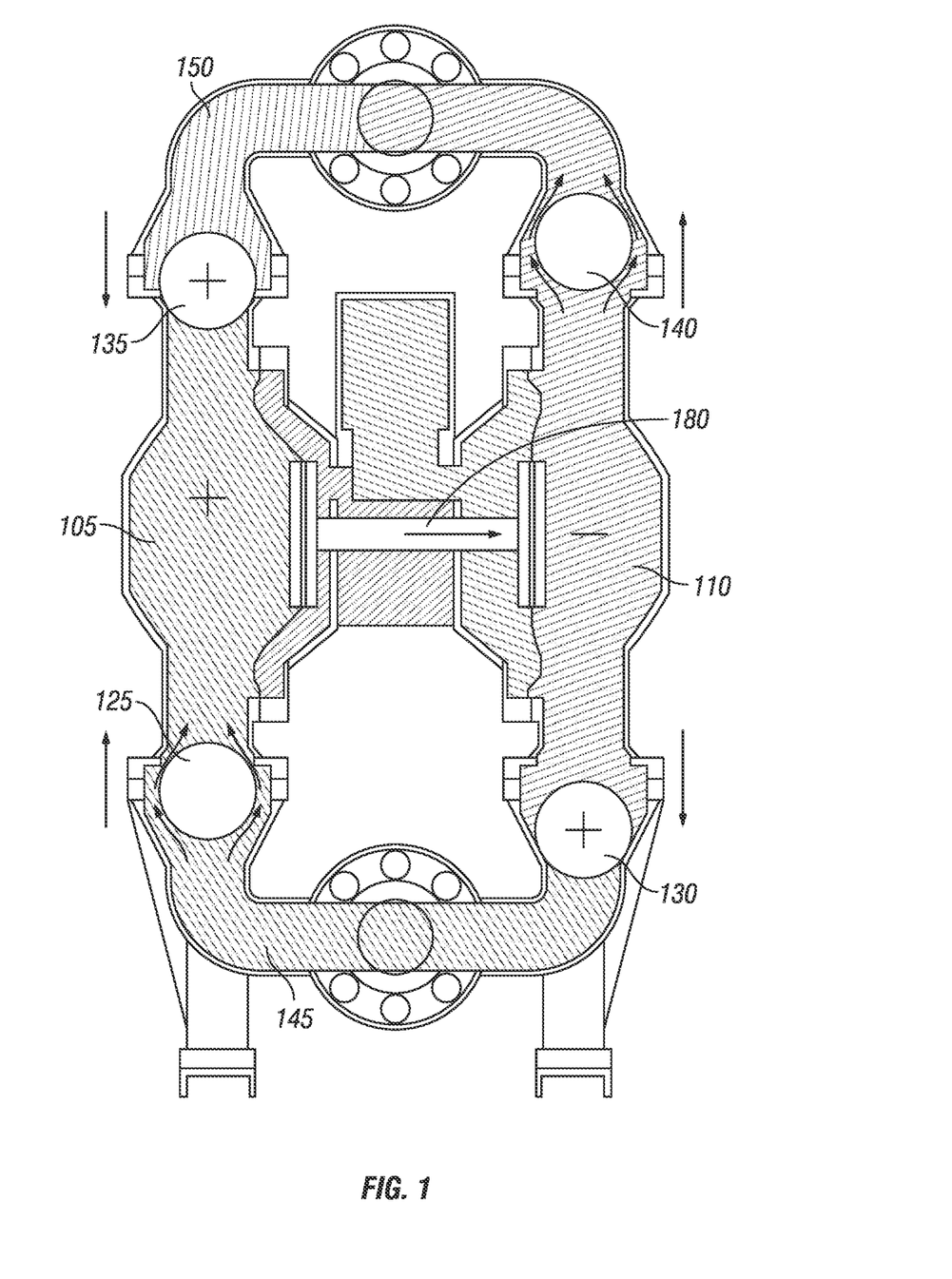
FIG. 1 and FIG. 2 show an existing prior art example of a dual diaphragm pump in the two stages of pumping.
Figure 2:
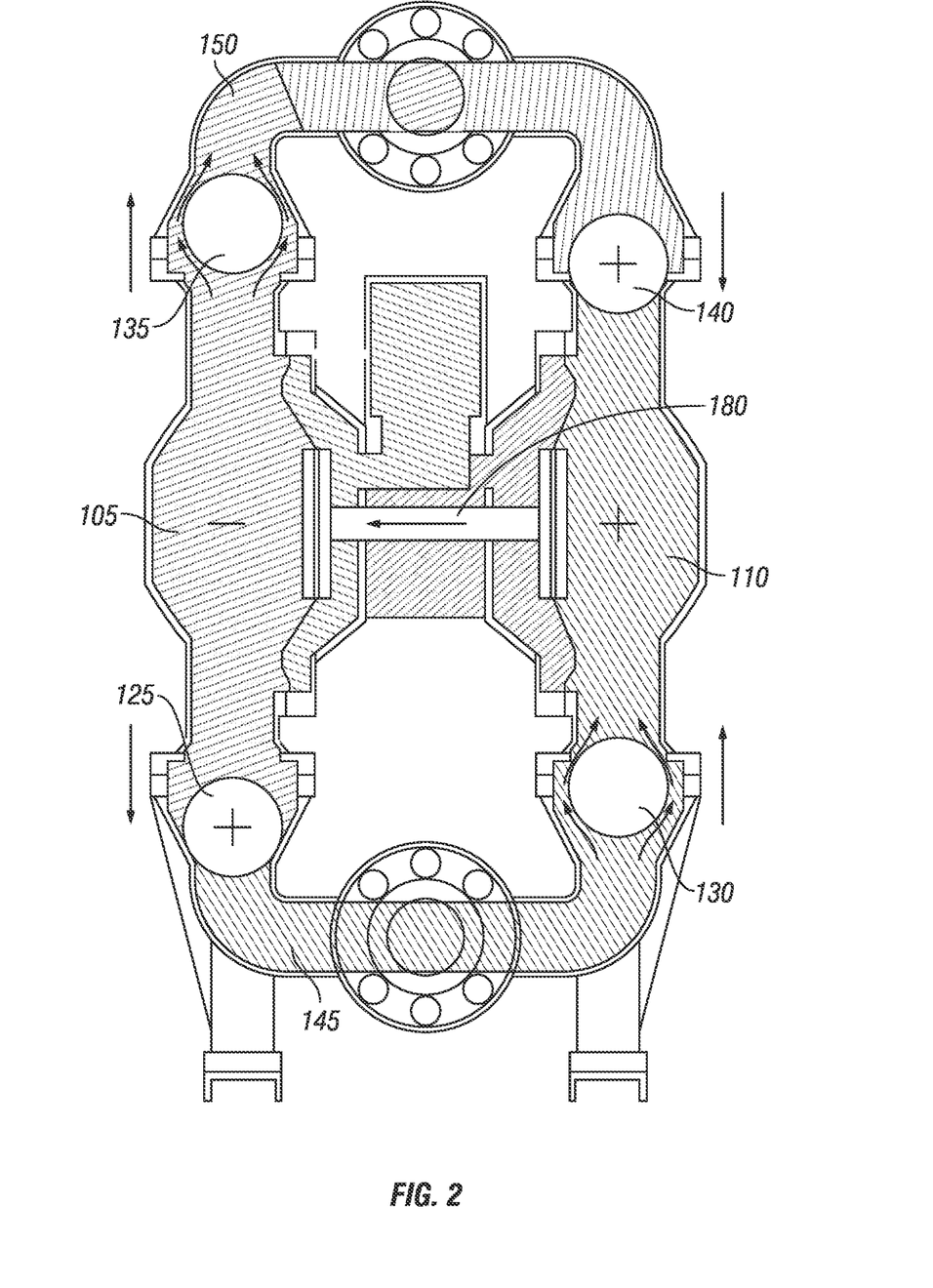

Details of the operation of a typical existing Dual Diaphragm Pump 100 are shown in FIGS. 1 and 2.

FIG. 1 shows First Pumping Chamber 105 being filled with fluid from the Inlet Manifold 145. First Outlet Check Valve 135 is seated and stopping any inflow of fluid from the outlet side of the pump and First Inlet Check Valve 125 is open allowing the inflow of fluid. The volume of First Pumping Chamber 105 is expanding by the movement of Spindle Valve 180 to the right. At the same time Second Pumping Chamber 110 is delivering fluid through the Outlet Chamber 150. This is enabled because the increasing pressure in Second Pumping Chamber 110 causes Second Inlet Check Valve 130 to close and Second Outlet Check Valve 140 to open.

The Spindle Valve 180 is designed to move back and forth between two positions. The various internal ports and fluid channels of the Spindle Valve 180 are designed to direct gas pressure to the diaphragm of First Pumping Chamber 105 and release the compressed gas from the diaphragm of Second Pumping Chamber 110. When the spindle had been pressurized all the way in one direction, ports and channels in the spindle valve become repositioned which redirects the incoming compressed gas and drives the spindle valve in the other direction which then decreases the volume in the other pumping chamber which pressurizes the other pumping chamber. This results in the spindle valve shuttling back and forth between the two positions. This results in fluid being pumped alternatively between the two pumping chambers.

FIG. 2 shows the Spindle Valve 180 moving to the left which causes fluid to be drawn into Second Pumping Chamber 110 from Inlet Manifold 145. and delivering fluid from First Pumping Chamber 105. All other operational features are analogous to that described for FIG. 1. All of the check valves are in their opposite position from that shown in FIG. 1. If they were open in FIG. 1 they are closed in FIG. 2.

BRIEF SUMMARY OF THE INVENTION

The present invention redirects the exhaust gas from a compressed gas operated pump into the fluid outlet chamber of the pump to generate a compressed gas foam that is then propelled out of the pump and then typically propelled into a hose or other distribution system for application of the foam where desired. Further details and improvements will be disclosed in additional embodiments of the present invention.

The instant invention enables the generation of high-energy foam without the additional hardware, expense, and fragility of separate mixers and/or proportioners.

It should be understood that the terms hose, tube, tubing, pipe, piping and other related terms are meant to be interchangeable with each other as used in this application.

BRIEF DESCRIPTION OF THE DRAWINGS

Existing compressed air foam systems and embodiments of the present invention will now be described. A better understanding of the prior art and the present invention will be realized from the detailed description which follows, taken in conjunction with the accompanying drawings in which.

DETAILED DESCRIPTION OF THE INVENTION

The present invention avoids all the drawbacks from utilizing a separate t-fitting to re-utilize the exhaust gas from a compressed gas driven pump. The exhaust gas from the pump, under current designs, is either allowed to escape to the atmosphere or directed to or through a muffler. The re-utilized exhaust gas is introduced into the outlet manifold of the pump. Ideally, the outlet fitting located on the outlet manifold is centrally located between each of the outlets of the two diaphragms of a dual diaphragm pump. This permits the inlet for the exhaust gas, after it has left the shuttle valve, to be located directly opposite and co-axial with a manifold discharge port. This unique and novel exhaust gas inlet location aids in directing the fluid flow, from each of the two pumping elements, out of the of the outlet manifold. This results in greater mixing and great efficiency in foam generation.

One Embodiment of the Invention

Figure 3:
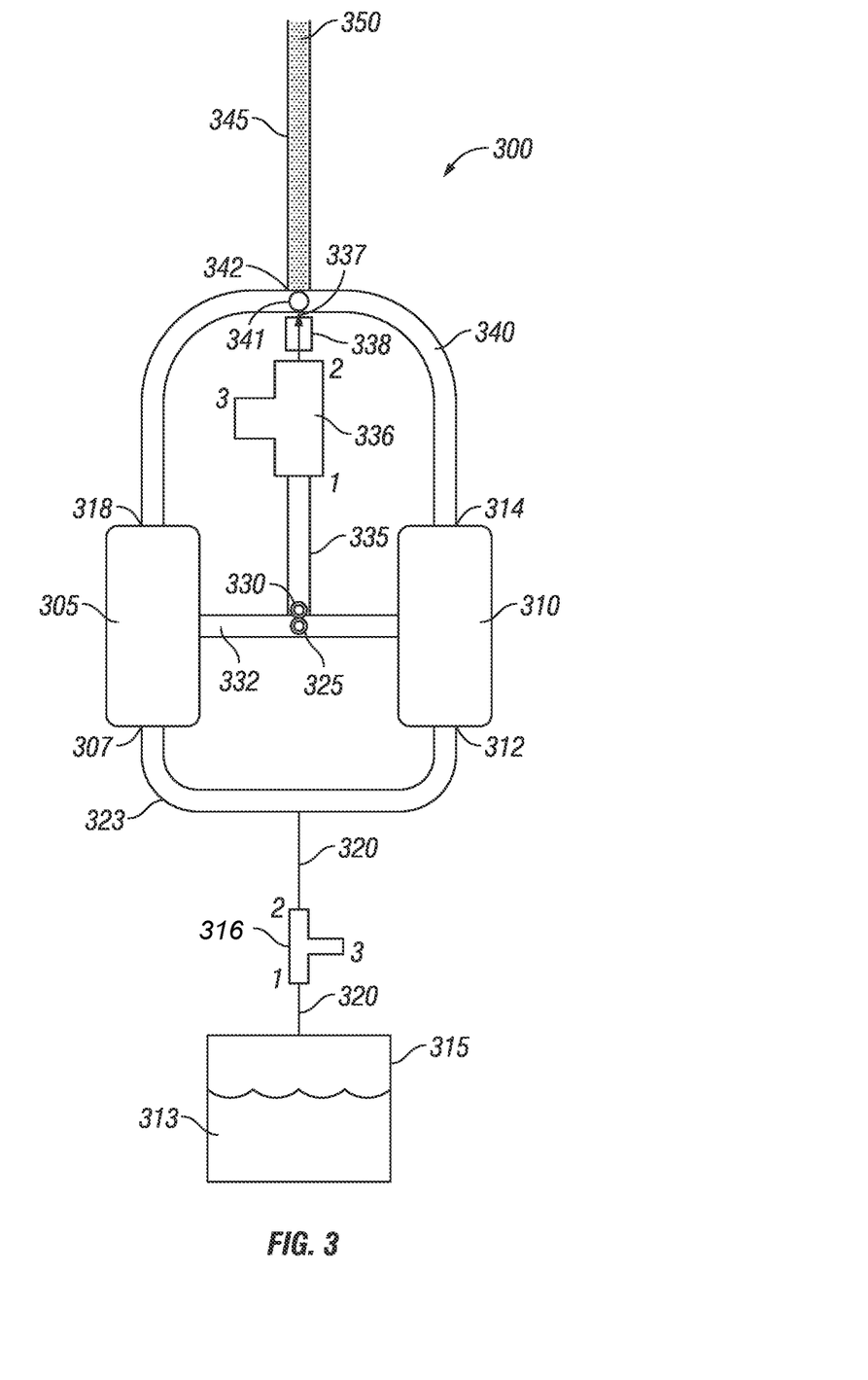
FIG. 3 is a schematic of one embodiment of the present invention.

A preferred embodiment of the present invention is shown in FIG. 3. Exhaust Gas Re-utilization Pump 300 is disclosed in FIG. 3. It consists of a compressed gas driven dual diaphragm pump with the novel and non-obvious feature of directing the exhaust gas that has been used to operate the pump into the Outlet Manifold 340. This combination of the fluid/foaming agent being delivered by the pump with the addition of the exhaust gas from the pump results in the generation of a compressed gas foam at the intersection of the Exhaust Gas Inlet 337 and the Manifold Discharge Port 342 and is then directed to the Delivery Line 345 as shown as Compressed Gas Foam 350. The dual diaphragm pump consists of a First Pumping Element 305 and a Second Pumping Element 310. Incoming Fluid 313 is drawn from Fluid Storage Container 315. Incoming Fluid 313 is typically a mixture of water and a foaming agent. The fluid is directed into an optional Inlet Fluid Valve 316 by Fluid Delivery Line 320.

Inlet Fluid Valve 316 is a three-way two-position valve. The first port is connected to the Fluid Storage Container 315. The second port is connected to the Inlet Manifold 323. There are three possible flow paths for the Incoming Fluid 313.

The first flow path is a straight-through flow wherein the Incoming Fluid 313 is delivered by the Inlet Fluid Valve 316 directly to the Inlet Manifold 323, where the flow is in through port 1 and out through port 2. Port 3 is blocked so that there is no connection of port 3 to the atmosphere. This flow path would be used during normal CAF operation.

The second flow path has the port 1 blocked and therefore Incoming Fluid 313 cannot be drawn into Exhaust Gas Re-utilization Pump 300. Port 2 is connected to port 3 and port 3 is open to the atmosphere. If the Exhaust Gas Re-utilization Pump 300 is still operating, it will draw in air from the open port 3 and the pump will no longer be pumping Incoming Fluid 313, though air will be delivered through the pump. However, the exhaust gas will still be delivered through the Outlet Manifold 340 and Delivery Line 345. This configuration of the Inlet Fluid Valve 316 is used after the need to generate Compressed Gas Foam 350 is over and the Delivery Line 345 needs to be flushed and/or dried.

It should be noted that the Inlet Fluid Valve 316 and the Fluid Storage Container 315 are not part of the present invention but are discussed herein in order to provide an understanding of how the present invention might be configured during actual use. The incoming Fluid Storage Container 315 might be, but is not limited to, a swimming pool, a pond, a lake, a rain water collection cistern, standard municipal water supply and other large volume storage devices or supply sources.

Adding a foaming agent into such a large source is not advisable for any number of reasons. Therefore, if use of a large water source is anticipated, including an inlet tee allows for the instruction of fresh foaming agent as needed.

First Pumping Element 305 draws Incoming Fluid 313 from Inlet Manifold 323 through First Inlet 307. Second Pumping Element 310 draws Incoming Fluid from Inlet Manifold 323 through Second Inlet 312.

The Spindle Valve 332 alternatively directs compressed gas to each of the First and Second Pumping Elements 305 and 310. Compressed gas (not shown) is introduced into the Spindle Valve 332 via Compressed Gas Inlet 325. As discussed previously in the Background section, the First and Second Pumping Elements 305 and 310 alternate between intake and output operations such that while one pumping element is performing an intake operation the other is performing an output operation. Compressed gas can be provided by several sources, which includes but is not limited to compressed gas cylinders or compressors operated by a power source which could include, but is not limited to an internal combustion engine, a PTO, or electricity.

First Outlet 318 and Second Outlet 314 of the First and Second Pumping Elements 305 and 310 are directly connected to the Outlet Manifold 340. Outlet Manifold 340 has two additional fluid connections. One is the Manifold Discharge Port 342 which is connected to the Delivery Line 345. The other is the Exhaust Gas Inlet 337.

Compressed gas that exits from the Spindle Valve 332 is referred to as Exhaust Gas. Exhaust Gas is delivered from the Exhaust Gas Outlet 330 of the Spindle Valve 332 to the Exhaust Gas Inlet 337 on the Outlet Manifold 340.

In the preferred embodiment, Exhaust Gas Inlet 337 is located directly opposite the Manifold Discharge Port 342 so that the Exhaust Gas Inlet 337 is co-axial with the Manifold Discharge Port 342. This configuration allows for a more thorough foam generation caused by the even mixing of the exhaust gas with the alternating fluid streams being delivered by the First and Second Pumping Elements 305 and 310.

There are two optional elements that can be inserted into Compressed Gas Exhaust Line 335. The first optional element is a Three-way Valve 336. The Three-way Valve 336 has two positions. In the first position, ports 1 and 2 are connected and port 3 is blocked. Thus, the Exhaust Gas is directed into the Outlet Manifold 340 by way of the Exhaust Gas Inlet 337. This would be the usual operating position and will generate Compressed Gas Foam 350. The second position of the Three-way Valve 336 connect ports 1 and 3.

This second position redirects the exhaust gas to atmosphere resulting in a standard pump which does not generate a compressed gas foam in the Outlet Chamber 340. Note that an optional hose and aspirating nozzle can be affixed to the Manifold Discharge Port 342 which would permit the generation of a low-energy aspirated foam.

Further, port 3 can be connected to a standard muffler to attenuate the noise generated by the Exhaust Gas Re-utilization Pump 300.

Inclusion of Three-way Valve 336 allows greater flexibility in the use of the equipment. Thus, the user can choose to generate a compressed gas foam, generate an aspirated foam with the addition of an aspirating nozzle or simply using the invention as a standard pump.

The second optional element than can be incorporated into Compress Gas Exhaust Line 335 is Check Valve 338.

Check Valve 338 is oriented so that the exhaust gas flow can flow into the Outlet Manifold 340 but that there is essentially no flow from the Outlet Manifold 340 out through Exhaust Gas Inlet 337. The inclusion of the Check Valve 338 is not essential. Without a check valve, foam can be created, but there would be major stress on the hardware. Check Valve 338 keeps almost all fluid in the Outlet Manifold 340 from being delivered backwards into the Spindle Valve 332. In addition, without a check valve, the foam that is generated is of inferior quality and consistency.

An additional optional element is Auxiliary Compressed Gas Input 341. This is a second compressed gas inlet that originates from some other source than the exhaust gas that exists from Spindle Valve 332. By adjusting the flow of the auxiliary gas input, the composition of the Compressed Gas Foam 350 can be altered. As the flow rate of the auxiliary gas increases, Compressed Gas Foam 350 becomes drier and less dense. This drier foam could be more useful when foaming walls and inverted surfaces. Though Auxiliary Compressed Gas Input 341 could be located anywhere in Outlet Manifold 340, the best location is right at the intersection of Exhaust Gas Inlet 337 and Manifold Discharge Port 342.

Specific Embodiment of the Present Invention

Figure 4:
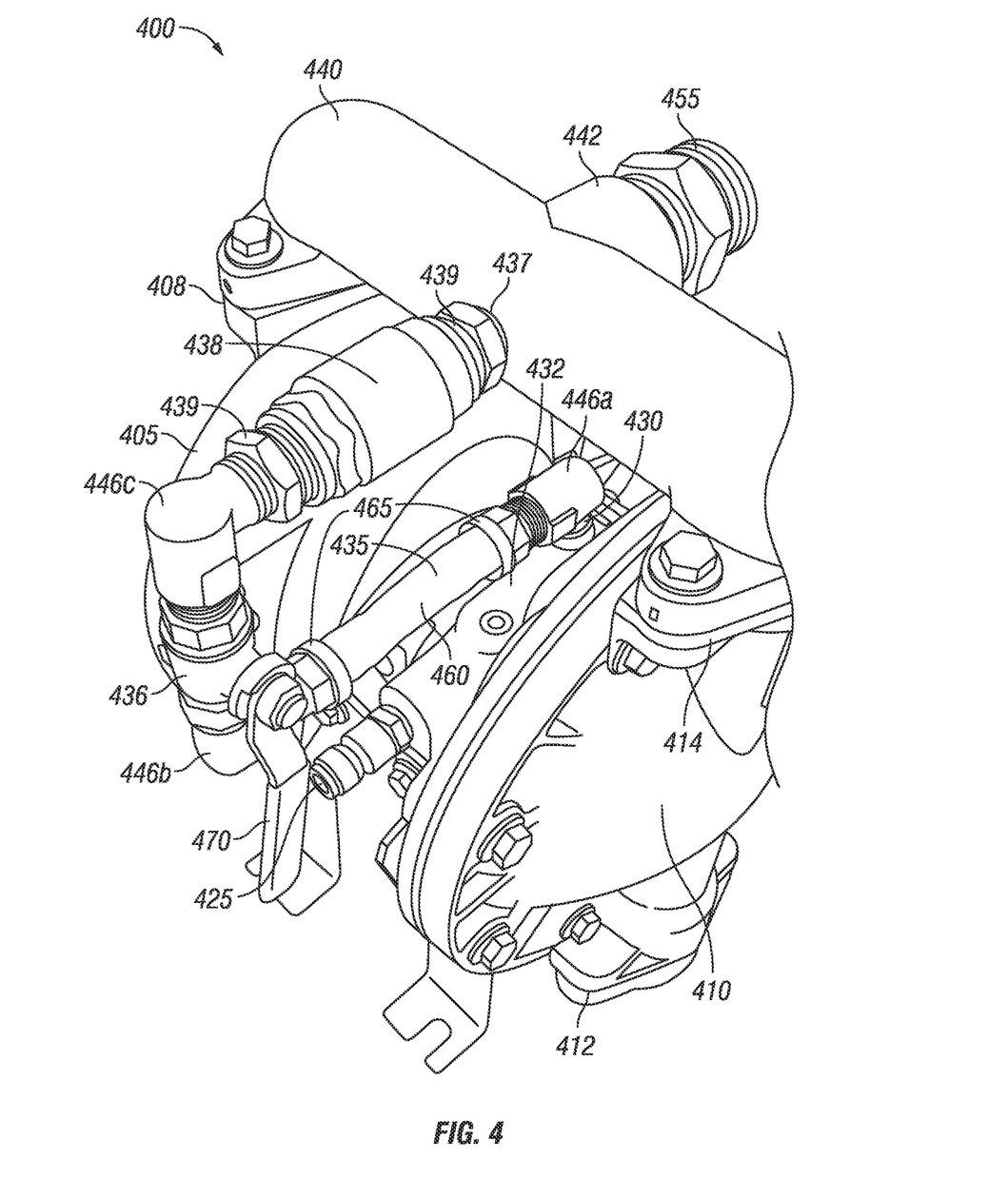
FIG. 4 shows a perspective view of a second embodiment of the invention.

FIG. 4 shows a specific embodiment of the present invention. It specifically shows the implementation of the re-utilization gas feature and the various configurations that can be implemented with a three-way valve.

Exhaust Gas Re-utilization Pump 400 is based upon a standard dual-diaphragm pump. An Ingersol-Rand/ARO Pro series 666 is an example of a dual diaphragm pump useable in the present invention.

The Exhaust Gas Re-utilization Pump 400 comprises First and Second Pumping Elements 405 and 410. The Second Inlet 412 to Second Pumping Element 410 is shown. First Inlet and Inlet Manifold are not visible in FIG. 4.

First Outlet 408 and Second Outlet 414 are shown in fluid communication with Outlet Manifold 440. Compressed Gas Inlet 425 is adapted to receive incoming compressed gas to be used by Spindle Valve 432 to drive the pumping elements of Exhaust Gas Re-utilization Pump 400. Compressed gas is delivered from Spindle Valve 432 via Exhaust Gas Outlet 430.

There are several fittings discussed below which direct the flow of the exhaust gas from Exhaust Gas Outlet 430 to the Exhaust Gas Inlet 437 of Outlet Manifold 440. In this embodiment the exhaust gas is directed through a flexible rubber hose, a manual shutoff valve, and a check valve. This is just one of a number of possible component arrangements that will direct the exhaust gas from the Exhaust Gas Outlet 430 to the Exhaust Gas Inlet 437.

The specific components used in this embodiment are listed below:

| | |
|---|---|
| Right-Angle Adapter 446A | The first of three identical right-angle adapters connect to a Barbed-Hose Adapter 465. |
| Barbed-Hose Adapter 465 | One of the Barbe-Hose Adapters 465 connects the Right-Angle Adapter 446A to a first end of Flexible Hose 460. |
| Flexible Hose 460 | Flexible Hose 460 significantly reduces vibration and noise. Each end of Flexible Hose 460 is fitted with a Barbed-Hose Adapter 465. |

| | |
|---|---|
| Barbed-Hose Adapter 465 | These fittings adapts each end of Flexible Hose 460 to attach to one of the Right-Angle Adapters 446A or 446B. |
| Right-Angle Adapter 446B | This is the second right-angle adapter in this embodiment. This component directs the exhaust gas from the Flexible Hose 460 to Shutoff Valve 436. |
| Shutoff Valve 436 | When Shutoff Valve 436 is put in the Off configuration, the flow of exhaust gas is terminated. When there is no flow of compressed gas, the pump stops operation. Shutoff Valve 436 can be replaced with valves having other configurations which are discussed below. Shutoff Valve 436 is actuated by Handle 470. |
| Right-Angle Adapter 446C | This adapter directs exhaust gas flow to Check Valve 438. Check Valve 438 is a spring-loaded type of check valve and allows exhaust gas to only flow into the Outlet Manifold 440. |
| Bushing 439 | There are two Bushings 439 fitted into each end of Check Valve 438. The first Bushing 439 adapts the inlet of the Check Valve 438 to accept the outlet of Right-Angle Adapter 446C. The second Bushing 439 adapts the outlet of Check Valve 438 to mate with the Exhaust Gas Inlet 437 of Outlet Manifold 440. |
| Check Valve 438 | Check Valve 438 is oriented to allow exhaust gas to flow into the Outlet Manifold 440 but reduce significantly fluid pulsations in Outlet Manifold 440, generated by the First and Second Pumping Elements (405 and 410), from flowing past the Check Valve 438. |
| Outlet Adapter 455 | The Outlet Adapter 455 adapts the Manifold Discharge Port 442 to be able to accept the required hose fitting. This typically would be fire hose-type fitting. This fire hose Outlet Adapter 455 has a 1" diameter National Pipe Thread on one end of the adapter and a 1.5" National Hose Thread on the second end of the adapter. Adapters with other types and/or sizes of adapter thread can be used to meet the needs of the user. |

The specific arrangements of fitting, adapters, check valves, bushings, and barbed fittings, shown in FIG. 4, works well for the inclusion of the three optional components: i) Flexible Hose 460, ii) Shutoff Valve 436 and iii) Check Valve 438. Exhaust Gas Outlet 430 could be plumbed without any of the above optional elements and using a minimum of standard plumbing fittings and tubing, to run the exhaust gas from the Exhaust Gas Outlet 430 to Exhaust Gas Inlets 437.

Any one or all of the three optional components discussed above can be included and in any sequential order. However, the order as shown in FIG. 4 is optimal.

Shutoff Valve 436 can simply be excluded which then would require that the compressed gas flow be controlled by regulating the gas flow before it enters Compressed Gas Inlet 425. Alternatively, Shutoff Valve 436 can be replaced with a three-way valve which would enable exhaust gas to be directed to the Outlet Manifold 440 as described above, exhaust gas directed to atmosphere, either directly or through a muffler, or the flow of compressed gas is occluded and there is no compressed air foam created or fluid pumped.

Details of the three positions are shown in the table below.

Port 1 is the inlet to the three-way Shutoff Valve 436.

Port 2 is connected directly or indirectly to the Exhaust Gas Inlet 437.

Port 3 is connected to atmosphere, with or without a muffler being attached.

(In the table below, "1-2" means Port 1 is connected to Port 2 and "1-3" means Port 1 is connected to Port 3.)

| Position # | Port 1 | Port 2 | Port 3 | Notes |
|---|---|---|---|---|
| 1 | 1-2 | 1-2 | occluded | Exhaust Gas is directed to the Outlet Manifold 140 and CAF is generated. |
| 2 | 1-3 | occluded | 1-3 | Exhaust Gas is directed to port 3 which is open to the atmosphere either directly or through a muffler. No compressed air is directed to the Outlet Manifold 140 and therefore no compressed air foam is generated. However, because compressed gas is flowing through the pump, the pump would continue to operate as a standard pump, pumping whatever is provided to the intake ports. This position allows for the use of an aspirated nozzle for the generation of aspirated foam. |
| 3 | occluded | 1-3 | 1-3 | The flow of compressed gas is blocked and the pump ceases to operate. There is no compressed air foam created and no fluid is pumped. This essentially turns off the pump. |

The three connection ports on a three-way valve are essentially identical in function. Referring to one connection port as an inlet or an outlet is based solely upon how the valve is plumbed and functions in a particular configuration.

Alternative Location of Exhaust Gas Inlet

An important feature of the present embodiment is that the center of the Exhaust Gas Inlet 437 is co-axial with the center of the Manifold Discharge Port 442. An alternative, though less preferred location, for the exhaust gas inlet is shown in FIG. 5.

Figure 5:
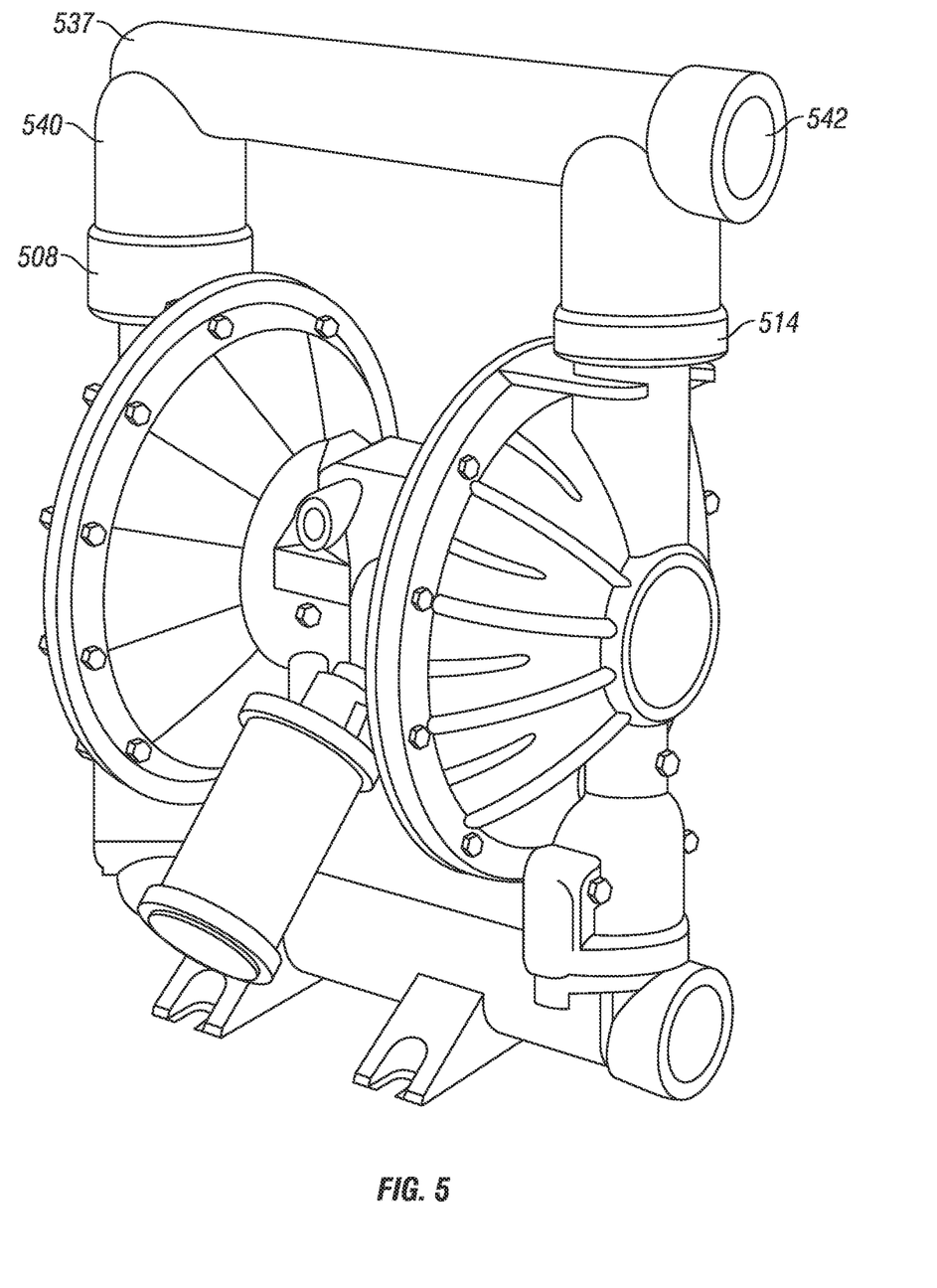
FIG. 5 shows a perspective view of a third embodiment of the invention.

An alternative embodiment is shown in FIG. 5. In this alternative embodiment, the Manifold Discharge Port 542 is located at one end of Outlet Manifold 540 and one of the inlets from the first of the two diaphragms is located at the far end of the Outlet Manifold 540 and the inlet from the second outlet from the other diaphragm is located near opposite end of the Outlet chamber just proximal to the outlet fitting.

The First Outlet 508 is directly connected to a first end of Outlet Manifold 540 and Second Outlet 514 is directly connected to the opposite end of Outlet Manifold 540. Manifold Discharge Port 542 is located at the second end of Outlet Manifold 540 adjacent to the Second Outlet 514. When the Outlet Manifold 540 is configured as shown in FIG. 5, the exhaust gas inlet could be located at the Proposed Exhaust Gas Inlet 537 at the first end of Outlet Manifold 540. This configuration is not expected to generate compressed air foam as good as that produced when the Proposed Exhaust Gas Inlet 537 and the Manifold Discharge Port 542 are co-axially located and located in close proximity to each other.

Figure 6:
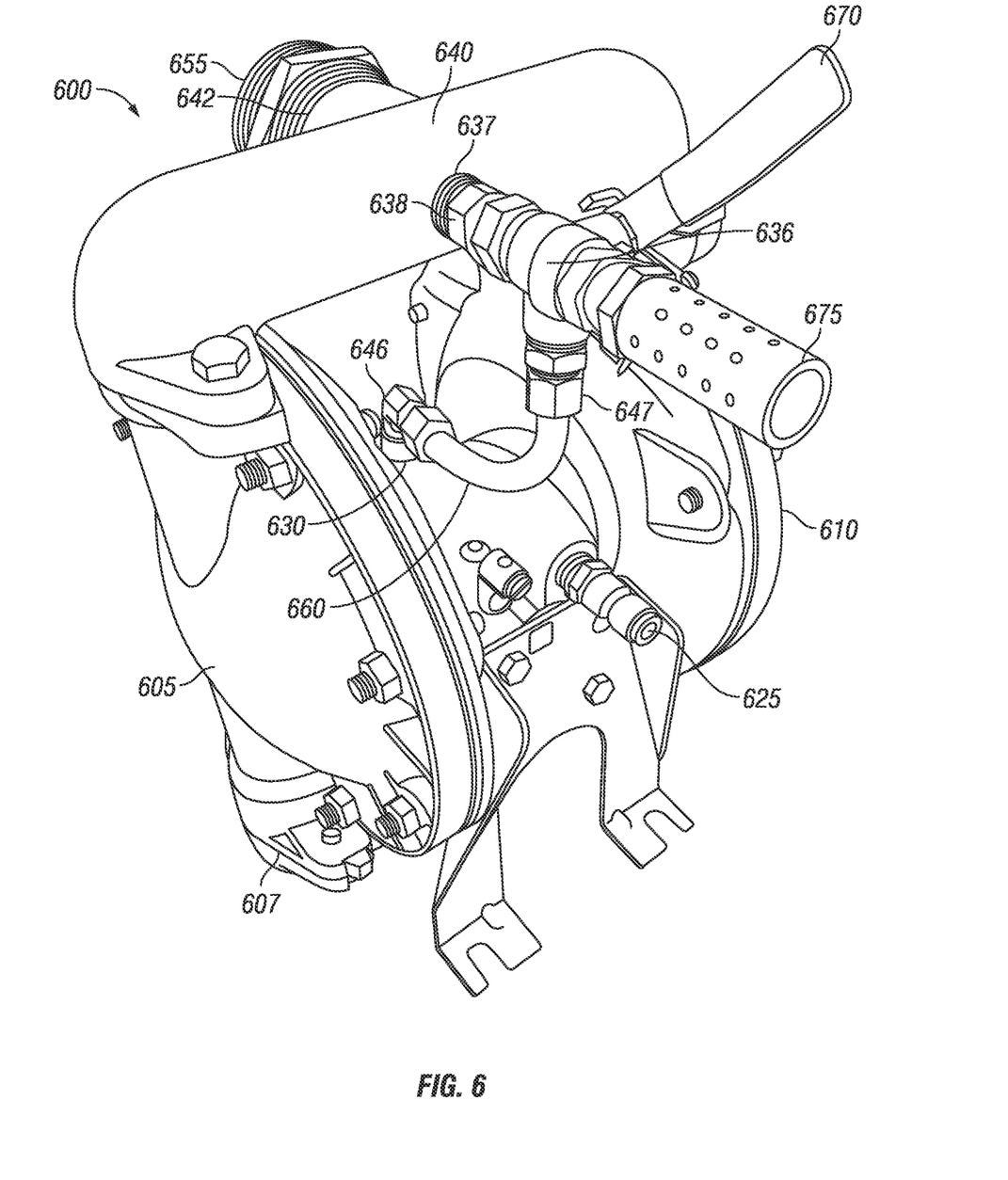
FIG. 6 show a perspective view for a fourth alternative embodiment for the invention.

FIG. 6 shows another embodiment of the invention which utilizes fewer components to accomplish the same results as shown in FIG. 4. The essential components of the Exhaust Gas Re-Utilization Pump 600 will be discussed. A nominal number of other features are shown in order that the context of the recirculating gas feature can be properly understood. Exhaust Gas Re-Utilization Pump 600 is a dual diaphragm pump with First Inlet 607 shown and what is shown as Second Inlet 412 in FIG. 4 is not visible in FIG. 6. First Pumping Element 605 receives fluid from First Inlet 607 and Second Pumping Element 610 receives fluid from the Second Inlet, not shown. Compressed Gas Inlet 625 provides the means of delivering compressed gas to Exhaust Gas Re-Utilization Pump 600. As shown, Compressed Gas Inlet 625 is a standard quick-connect fitting. The use of a quick-connect fitting is convenient. However, any standard plumbing fitting configured to contain the psi of the compressed gas can be used.

The compressed gas exits by way of Exhaust Gas Outlet 630. The compressed gas is directed to the inlet port of Three-way Valve 636 via Tube 660. Three-way Valve 636 is a three-way two position valve. Adapters 646 and 647 adapt each end of Tube 660 to Exhaust Gas Outlet 630 and the inlet to Three-way Valve 636 respectively. In this embodiment Adapter 646 is a right-angle ⅜" compression fitting to a ⅜-inch male NPT. Adapter 647 is a straight ⅜" compression fitting to a ⅜-inch male NPT. Check Valve 638 connects the first outlet of Three-way Valve 636 to the Exhaust Gas Inlet 637. In addition to providing a means to attach the first outlet of Three-way Valve 636 to the Exhaust Gas Inlet 637, Check Valve 638 is oriented to prevent pulsations and fluid in the Outlet Manifold from being force back into the Three-way Valve 636 and potentially into the pump. In a typical installation, Outlet Adapter 655 is configured to allow the attachment of a fire hose. In that situation, Outlet Adapter 655 has a 1" diameter National Pipe Thread on one end of the adapter and a 1.5" National Hose Thread on the second end of the adapter. Other types and/or sizes of adapters can be used to meet the needs of the user.

Three-way Valve 636 in this configuration is three-way two position valve. As discussed above, such a valve when in a first position, directs the exhaust gas to the Exhaust Gas Inlet 637 of the Outlet Manifold 640. The compressed gas foam created is forced out of Manifold Discharge Port 642. Outlet Adapter 655 allows the connection of a fire hose to the Manifold Discharge Port 642.

In the other position of Three-way Valve 636, the exhaust gas is directed to the Muffler 675. As discussed previously, when the exhaust gas is directed to the muffler, there is no exhaust gas directed to the Outlet Manifold 640. The results in the pump operating as a normal fluid pump without the advantage of the generation of the compressed air foam. It is possible to attach an aspirating nozzle at the ultimate outlet of the fluid being pumped. As discussed above the type of foam generated by an aspirating nozzle is different than the compressed gas foam that this system can generate when the valve is in the first position. It is also an option to attach a standard water nozzle at the ultimate outlet of the fluid being pumped to allow Different sized fittings could be used as needed to adapt the various components based upon availability of specific fittings and the needs of the user.

For the sake of clarity of FIG. 6, Valve Handle 670 is shown in an intermediate position, half-way between the two normal operating positions.

Application for Radiation Situations

The use of boron containing compounds such as borax and deuterated boronic acid to quench nuclear reactions is a widely-known technology. Many reactors will have various mean to physically place control rods into the reactor as means to slow down or halt a nuclear reactor. If inserting the control rods fails or does not sufficiently quench the reaction, then, as a back up, solutions of various boron compounds are dumped into the reactor. Most installations, in an emergency, will flood the reactor core with a boron solution. This introduces both water and a boron compound into the spaces around and between the fuel rods, providing cooling, and neutron absorption.

The boron component of the solution functions by absorbing neutrons. This quenches the reaction, while the water component of the solution facilitates cooling.

Therefore, large volumes of a boron solution may be able to adequately quench the reaction, cool the core, and enable full shut down. However, in the event of a breach of a nuclear reactor vessel, such that the control rods can no longer be submerged by the boron solution, the boron solution will simply flow out through the breach. Then the efficacy of the boron solution is very poor because it is flowing past the rods and never fully submerges the control rods in the boron solution. Use of a compressed gas foam containing boron compounds can help address this problem.

An embodiment of this invention can be utilized to produce a boron-containing foam, which, rather than flowing out through a breach, would adhere to interior surfaces and occupy some or all of the interior volume of the reactor. The foam composition can be adjusted to provide enough water for cooling, but enough boron to dampen the nuclear reaction. Further, as a breach represents a loss of pressure, the temperature of the core may be well above the boiling point of water, and the foam in this case will act to coat the control rods in the various boron compounds as the foam is heated and dries.

Another advantage of the present invention is that it can be actuated by a remote valve which could control the source of compressed gas to the pump. Turning on the pump, which would deliver boron foam, could be accomplished by opening a single on/off valve which would control delivery of the compressed gas to the pump. This on/off valve could be located at a safe and typically distant location with connecting tubing and/or piping delivering compressed gas from the source to the pump. Furthermore, the valve could be controlled electronically and/or wirelessly (WIFI or various radio frequencies). In order to allow the delivery of boron foam even in the most dire of circumstances, the valve can be operated manually from a safe position, which could be in a radiation protected bunker and several hundred feet or more from the pump. Because delivery of the boron foam doesn't require any electricity or water (other than the boron fluid in the inlet tank), the system can operate even when all other utilities are not operating.

Though the above discussion disclosed use of solutions of various boron compounds, the system could be used with any solution capable of generating a foam and known or thought to be effective in quenching a nuclear reaction.

In addition, use of a foam in this situation would drastically reduce the amount of runoff which can spread radiation and other toxic compounds outside of the reactor.

Parts Kits

As an alternative to obtaining a pump already constructed to take advantage of the enhanced CAFS as discussed above, a Parts Kit can be assembled and provided which would enable a person to modify and adapt an existing pump to have the capabilities of generating CAF as disclosed above. There are at a number of kits that could be assembled, ranging from very simple to the complex.

i. Kit 1

This kit would allow a CAFS in a very simple form to be constructed.

First there are the tools for making a threaded opening for the exhaust gas inlet. A threaded opening would require a drill bit having a prescribed size and then a tap sized to cut the threads. For example, if a ½ inch NPT threaded hole is to be made, an initial $^{23}/_{32}$ inch hole would have to be drilled which is the proper size to enable M NPT tap to thread a ½ NPT hole Next there needs to be a first adapter fitting with the first end of the adapter having a male ½ NPT and the other end having, typically a ⅜ inch compression fitting. This compression fitting would allow the attachment of one end of a length of ⅜ inch copper pipe that has been bent to allow the exhaust gas from the diaphragm pump to be redirected to the Outlet Manifold. The second end of the copper tubing would be attached to a second adapter having a first end configured with a ⅜ inch compression fitting and the second end configured with 2 male NTP for attachment to the compressed gas outlet of the pump. The kit would comprise:

a $^{23}/_{32}$ drill;
a ½ NPT tap;
2⅜ inch compression fitting to ½ inch male NPT adapters; and
a length of ½ inch copper tubing which can be sized and bent to connect exhaust gas outlet from pump to the inlet exhaust gas inlet on the outlet manifold.

ii. Kit 2

This kit would allow the construction of a CAFS that is a bit more complicated. The $^{23}/_{32}$ drill and the ½ NPT tap would be used to form a ½ female NPT inlet to the outlet manifold.

It would include a three-way valve having one inlet and two outlets. The each of the outlets would be configured to have ½ inch female NPT. The kit would include 4 adapters having a ⅜ compression fitting on one end and a ½ inch male NPT on the other. The first end of the first length of copper tubing would be attached via the first adapter fitting to exhaust gas outlet. The ½ inch NPT end of the adapter would be threaded into the female ½ NPT of the exhaust gas outlet, and the ⅜ compression fitting used to attach to the first end of the first length of copper tubing. The second end of the first length of copper tubing would be connected by the second adapter to the inlet of the three-way valve. The first outlet of the three-way valve would be connected by the second length of copper tubing using the third and fourth adapter. Each ⅜ compression fitting of the third and fourth adapter would be attached to an end of the second length of copper tubing. This would allow, when the three-way valve is properly position, the exhaust gas to be directed from the outlet of the three-way valve to the exhaust gas inlet on the outlet manifold. Alternatively in the other position, the exhaust gas would be directed to the second outlet which could be open the atmosphere. In this configuration, the pump would not generate any CAF and any fluid provided to the intakes would simply be drawn into the pump and delivered out of the manifold discharge port.

The kit would comprise:
a $^{23}/_{32}$ drill
a ½ NPT tap
4⅜ inch compression fitting to ½ inch NPT adapter
1 three-way valve having one female M NPT inlet and two female ½ NTP outlets,
2 lengths of ½ inch copper tubing; the first length of copper tubing which can be sized and bent to connect the exhaust gas outlet to the inlet of the three-way valve and
the second length of copper tubing which can be sized and bent to connect the first outlet of the three-way valve to the exhaust gas inlet on the outlet manifold.

iii. Kit 3

This kit would allow the construction of a CAFS similar to that described in Kit 2 above, but which also includes a check valve. The check valve would have ½ inch male NPT on the inlet end of the check valve and a ½ inch male NPT on the outlet end of the check valve.

All of the description above for Kit 2 would apply with the exception of inserting the check valve between the first outlet of the three-way valve and the first end of the second length of copper tubing. The valve would be oriented such that gas flow would be allowed in the direction of the three-way valve towards the outlet manifold.

The kit would comprise:
a $^{23}/_{32}$ drill
a ½ NPT tap
a check valve having one male NTP and one female ⅜ compressions fitting
4⅜ inch male compression fitting to ½ inch male NPT adapter
1 three-way valve having two female ½ NPT inlets and one female ½ NTP outlet,
2 lengths of ½ inch copper tubing; the first length of copper tubing which can be sized and bent to connect exhaust gas outlet to the inlet of the three-way valve and the second length of copper tubing which can be sized and bent to connect the outlet of the check valve to the exhaust gas inlet on the outlet manifold.

iv. Kit 4

Kit 4 comprises tools needed to create a threaded hole in the outlet manifold, a length of connecting tubing, and two adapters to connect the tubing from the compressed gas outlet of the pump to the threaded hole made in the outlet manifold.

v. Kit 5

Kit 5 comprises tools needed to create a threaded hole in the outlet manifold, 2 lengths of pipe, a three-way valve, a first adapter to connect the first length of tubing from the compress gas outlet of the pump to the inlet of the three-way valve, a second adapter to connect the outlet the three-way valve to the threaded hole in the outlet manifold.

vi. Kit 6

Kit 6 comprises tools needed to create a threaded hole in the outlet manifold, a length of pipe, a three-way, a check valve, a first adapter to connect the first length of tubing from the compress gas outlet of the pump to the inlet of the three-way valve, optionally a second adapter to connect the outlet of the three-way valve to the inlet of the check valve, and optionally a third adapter to connect the outlet of the check valve to the inlet of the outlet manifold.

Note that in some of the above kit descriptions, references are made to specific sizes and types of plumbing fittings, but the size and type of fittings can be changed to meet end user requirements and equipment supply considerations. Further, the copper tubing can be replaced by any type of flexible, bendable tubing which can sustain the type of pressures needed in a CAFS of the present invention.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

Whereas the present invention has been described with respect to specific embodiments thereof, it will be understood that various changes and modifications will be suggested to one skilled in the art and it is intended that the invention encompass such changes and modifications as falling within the scope of the appended claims.

What is claimed is:

1. An article of manufacture which comprises a pump that utilizes compressed gas to pump a fluid and generate a compressed gas foam comprising:
   a. a pump comprising at least one inlet, at least one outlet, an inlet chamber, an outlet chamber and a pumping means;
   b. said at least one fluid inlet is in fluid communication with the inlet chamber; the fluid outlet in fluid communication with the outlet chamber;
   c. said pumping means comprising a compressed gas inlet and a compressed gas outlet; said pumping means adapted to move fluid from the fluid inlet, through the inlet chamber to the outlet chamber and to the fluid outlet under pressure from said compressed gas;
   d. said three-way valve having one inlet and a first and a second outlet;
   e. said compressed gas outlet is in direct fluid communication with the input of said three-way valve;
   f. the first outlet of said three-way valve placed in direct fluid communication with the outlet chamber; and
   g. said three-way valve adapted to either direct the compressed gas to the outlet chamber
      to generate a compressed gas foam or alternatively direct the compressed gas to said second outlet.

2. An article of manufacture which comprises a pump that utilizes compressed gas to pump a fluid and potentially generate a compressed gas foam as described in claim 1 wherein said pumping means is a dual-diaphragm pump.

3. An article of manufacture which comprises a pump that utilizes compressed gas to pump a fluid and potentially generate a compressed gas foam as described in claim 2 wherein said exhaust gas entrance port into the outlet chamber is co-axial with the fluid exhaust port.

4. An article of manufacture which comprises a pump that utilizes compressed gas to pump a fluid and potentially generate a compressed gas foam as described in claim 3 further comprising a check valve positioned within the exhaust line; said check valve oriented to allow exhaust gas to essentially flow only into the outlet chamber.

5. An article of manufacture which comprises a pump that utilizes compressed gas to pump a fluid and potentially generate a compressed gas foam as described in claim 4 wherein said check valve is a spring-loaded check valve.

6. An article of manufacture comprising a pump which utilizes compressed gas to pump a fluid and generate a compressed gas foam comprising:
   a. a pump comprising at least one inlet, at least one outlet, an inlet chamber, and an outlet chamber and a pumping means;
   b. said at least one fluid inlet is in fluid communication with the inlet chamber; the fluid outlet in fluid communication with the outlet chamber;
   c. said pumping means comprising a compressed gas inlet and a compressed gas outlet; said pumping means adapted to move fluid from the fluid inlet, through the inlet chamber to the outlet chamber and to the fluid outlet under pressure from said compressed gas;
   d. the outlet of said two-way valve further placed in direct fluid communication with the outlet chamber; and
   e. said two-way valve adapted to turn off the flow of exhaust gas through the two-way valve and thus halting operation of the pump.

7. An article of manufacture which comprises a pump that utilizes compressed gas to pump a fluid and generate a compressed gas foam as described in claim 6 wherein said pumping means is a dual-diaphragm pump.

8. An article of manufacture which comprises a pump that utilizes compressed gas to pump a fluid and generate a compressed gas foam as described in claim 7 wherein said exhaust gas entrance port into the outlet chamber is co-axial with the fluid exhaust port.

9. An article of manufacture which comprises a pump that utilizes compressed gas to pump a fluid and generate a compressed gas foam as described in claim 8 further comprising a check valve positioned within the exhaust line; said check valve oriented to allow exhaust gas to essentially flow only into the outlet chamber.

10. An article of manufacture which comprises a pump that utilizes compressed gas to pump a fluid and potentially generate a compressed gas foam as described in claim 9 wherein said check valve is a spring-loaded check valve.

11. An article of manufacture comprising a pump which utilizes compressed gas to pump a fluid and generate a compressed gas foam comprising:
   a. a pump comprising at least one inlet, at least one outlet, an inlet chamber, and an outlet chamber and a pumping means;

b. said at least one fluid inlet is in fluid communication with the inlet chamber; the fluid outlet in fluid communication with the outlet chamber;

c. said pumping means comprising a compressed gas inlet and a compressed gas outlet; said pumping means adapted to move fluid from the fluid inlet, through the inlet chamber to the outlet chamber and to the fluid outlet under pressure from said compressed gas; from the fluid inlet, through
the inlet chamber to the outlet chamber and to the fluid outlet under pressure from
said compressed gas;

d. said compressed gas outlet is in direct fluid communication with the outlet chamber.

12. An article of manufacture which comprises a pump that utilizes compressed gas to pump a fluid and generate a compressed gas foam as described in claim 11 wherein said pumping means is a dual-diaphragm pump.

13. An article of manufacture which comprises a pump that utilizes compressed gas to pump a fluid and generate a compressed gas foam as described in claim 12 wherein said exhaust gas entrance port into the outlet chamber is co-axial with the fluid exhaust port.

14. An article of manufacture which comprises a pump that utilizes compressed gas to pump a fluid and generate a compressed gas foam as described in claim 13 further comprising a check valve positioned within the exhaust line; said check valve oriented to allow exhaust gas to essentially flow only into the outlet chamber.

15. An article of manufacture which comprises a pump that utilizes compressed gas to pump a fluid and potentially generate a compressed gas foam as described in claim 14 wherein said check valve is a spring-loaded check valve.

16. A kit comprising:
a drill and tap adapted to form a female threaded opening in the outlet manifold of a gas driven pump;
a length of tubing sized and bent to fit from the exhaust gas outlet of a gas-driven pump to the female threaded opening in the outlet manifold;
a first adaptor to attach the first end of the length of tubing to the exhaust gas outlet of said pump; and
a second adaptor to attach the second end of the length of tubing to the female threaded opening in the outlet manifold.

17. A kit as described in claim 16 further comprising;
a three-way valve configured to be able to be installed between the second end of the length of tubing and the exhaust gas inlet of the outlet manifold.

18. A kit as described in claim 17 further comprising:
an additional third and fourth adapters;
a three-way valve;
an additional second length of tubing sized and bent to connect the first outlet of the three-way valve to the exhaust gas inlet of the outlet manifold;
said third adapter configured to attach the first end of the second length of tubing to the first outlet of the three-way valve;
said fourth adapter configured to attach the second end of the second length of tubing to the female threaded opening in the outlet manifold; and
wherein said second adapter is configured to attach the second end of the first length of tubing to the inlet of said three-way valve.

19. A kit as described in claim 18 further comprising:
a check valve configured to be installed anywhere in the fluid path between the exhaust gas outlet of the pump and the female threaded opening in the outlet manifold; said check valve oriented to permit flow of exhaust gas from the exhaust gas outlet toward the outlet manifold.

20. A kit as described in claim 19 wherein said check valve is configured to be installed as close as possible to the exhaust gas inlet of the outlet manifold.

21. A kit comprising:
a. the tools necessary to create a threaded hole in the outlet manifold;
b. a length of connecting tubing; and
c. a first pair of adapters to connect the tubing from the compressed gas outlet of the pump to the threaded hole made in the outlet manifold.

22. A kit a described in claim 21 further comprising;
a. a second length of connecting tubing;
b. a three-way valve; and
c. a second pair of adapters to connect the three-way valve to the outlet manifold.

23. A kit as described in claim 22 further comprising:
a. check valve configured to be inserted in the line between the exhaust gas outlet and the outlet manifold.

24. A kit as described in claim 23 wherein said check valve is oriented to allow compressed gas to flow from the exhaust gas outlet to the outlet manifold.

* * * * *